(12) United States Patent
Baar et al.

(10) Patent No.: US 7,283,141 B2
(45) Date of Patent: *Oct. 16, 2007

(54) METHOD AND SYSTEM FOR ENHANCED DETAIL-IN-CONTEXT VIEWING

(75) Inventors: David J. P. Baar, Vancouver (CA); David J. Cowperthwaite, Burnaby (CA); Mark H. A. Tigges, Vancouver (CA)

(73) Assignee: Idelix Software Inc., Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/444,478

(22) Filed: Jun. 1, 2006

(65) Prior Publication Data

US 2006/0214951 A1   Sep. 28, 2006

Related U.S. Application Data

(63) Continuation of application No. 10/021,313, filed on Dec. 19, 2001, now Pat. No. 7,106,349.

(30) Foreign Application Priority Data

Dec. 19, 2000   (CA) .................................. 2328795

(51) Int. Cl.
  *G09G 5/00*   (2006.01)
(52) U.S. Cl. .................. 345/647; 345/619; 345/660; 345/672; 345/665; 345/680
(58) Field of Classification Search ................ 345/647, 345/660–680, 619, 648
See application file for complete search history.

(56) References Cited

U.S. PATENT DOCUMENTS 5,670,984 A * 9/1997 Robertson et al. .......... 345/661
2006/0033762 A1* 2/2006 Card et al. .................. 345/660

* cited by examiner

*Primary Examiner*—Kee M. Tung
*Assistant Examiner*—Chante Harrison
(74) *Attorney, Agent, or Firm*—Joseph Conneely; McCarthy Tetrault LLP

(57) ABSTRACT

An improved method for display of a transitional region of interest while transitioning between a first region of interest and a second region of interest within visual information on a display screen of a computer. The method comprising the steps of applying a transitional transformation to the visual information and displaying the transitional transformed visual information on the display screen. The transitional transformation requiring a reduced calculation for transforming the visual information in the transitional region.

38 Claims, 5 Drawing Sheets

METHOD AND SYSTEM FOR ENHANCED DETAIL-IN-CONTEXT VIEWING

This application is a continuation of U.S. patent application Ser. No. 10/021,313, filed Dec. 19, 2001, now U.S. Pat. No. 7,106,349 the disclosure of which is incorporated herein by reference.

This application claims priority from Canadian Patent Application No. 2,328,795, filed Dec. 19, 2000. The invention relates to the field of computer graphics processing, more specifically, the invention relates to the display of visual information including portable document format (PDF) files on a display screen of a computer.

BACKGROUND OF THE INVENTION

Display screens are the primary visual display interface to a computer. One problem with these visual display screens is that they are limited in size, thus presenting a challenge to user interface design, particularly when larger amounts of information is to be displayed. This problem is normally referred to as the "screen real estate problem".

Well known solutions to this problem include panning, zooming, scrolling or combinations thereof. While these solutions are suitable for a large number of visual display applications, these solutions become less effective where the visual information is spatially related, such as maps, newspapers and such like. In this type of information display, panning, zooming and/or scrolling is not as effective as much of the context of the panned, zoomed or scrolled display is hidden.

A recent solution to this problem is the application of "detail-in-context" presentation techniques to the display of large surface area media, such as maps. Detail-in-context presentation techniques take on many forms and are useful for displaying large amounts of information on limited size computer screens, and are becoming more important with the increased use of hand held computing devices such as personal digital assistance (PDA's) and cell phones.

Now, in the detail-in-context discourse, differentiation is often made between the terms "representation" and "presentation". A representation is a formal system, or mapping, for specifying raw information or data that is stored in a computer or data processing system. For example, a digital map of a city is a representation of raw data including street names and the relative geographic location of streets and utilities. Such a representation may be displayed visually on computer screen or printed on paper. On the other hand, a presentation is a spatial organization of a given representation that is appropriate for the task at hand. Thus, a presentation of a representation organizes such things as the point of view and the relative emphasis of different parts or regions of the representation. For example, a digital map of a city may be presented with a region magnified to reveal street names.

Detail-in-context presentations allow for magnification of a particular region of interest (the "focal region") in a representation while preserving visibility of the surrounding representation. In other words, in detail-in-context presentations focal regions are presented with an increased level of detail without the removal of contextual information from the original representation. In general, a detail-in-context presentation may be considered as a distorted view (or distortion) of a portion of the original representation where the distortion is the result of the application of a "lens" like distortion function to the original representation. A detailed review of various detail-in-context presentation techniques may be found in a publication by Carpendale, Marianne S. T., titled "A Framework for Elastic Presentation Space" (Burnaby, British Columbia: Simon Fraser University, 1999) and incorporated herein by reference.

Thus, detail-in-context presentations of data using techniques such as Elastic Presentation Space ("EPS") are useful in presenting large amounts of information on limited-size display surfaces. Detail-in-context views allow magnification of a particular region of interest (the "focal region") in a data presentation while preserving visibility of the surrounding information. Development of increasingly powerful computing devices has lead to new possibilities for applications of detail-in-context viewing. At the same time, the development of new compact, mobile computing platforms such as handheld computers, typically with reduced computing performance and smaller display surfaces as compared to desktop or mainframe computers, has motivated research into alternate implementation techniques and performance improvements to detail-in-context data presentation technologies. Consequently, one shortcoming of current EPS graphics technology and detail-in-context presentation methods is that being computationally inefficient, they are not optimized for newer compact, mobile computing platforms (e.g. handheld computers) that have reduced computing power. Considerable computer processing is required to distort a given presentation so as to produce a detail-in-context "lens", and to move the lens through the data with adequate performance to provide an acceptable level of interactivity to the user.

A need therefore exists for a method and system that will allow for the effective implementation of EPS graphics technology on computing platforms having variable levels of computing power. Consequently, it is an object of the present invention to obviate or mitigate at least some of the above-mentioned disadvantages.

SUMMARY OF THE INVENTION

In accordance with an aspect of the invention, there is provided an improved method for display of a transitional region of interest while transitioning between a first region of interest and a second region of interest within visual information on a display screen of a computer. The method comprises the steps of: applying a transitional transformation to the visual information, the transitional transformation requiring reduced calculations for transforming the visual information to transitional transformed visual information; and displaying the transitional transformed visual information on the display screen.

In accordance with a further aspect of the invention, there is provided a method for displaying the transition between regions of interest within visual information on a display screen of a computer. The method comprises the steps of: selecting a first region of interest within the visual information; applying a first transformation to the visual information to improve the visual detail in the first region of interest; and displaying the first transformed visual information on the display screen. Selecting a second region of interest within the visual information applying a second transformation to the visual information to improve the visual detail in the second region of interest; and displaying the second transformed visual information on the display screen. Selecting a transitional region of interest on a path between the first region of interest and the second region of interest within the visual information; applying a transitional transformation to the visual information to improve the visual detail in a predetermined portion of the transitional region of interest; and displaying the transitional transformed visual information on the display screen.

In accordance with yet a further aspect of the invention, there is provided a method for displaying visual information on a display screen of a computer. The method comprising the steps of: selecting a region of interest within the visual information; applying a transformation to the visual information for improving visual detail and presentation quality in the region of interest, the transformation for overlaying the visual information on a lens surface, the lens surface having predetermined shape for the region of interest. Projecting the lens surface with the overlaid visual information onto a plane. Increasing resolution of the visual information in the region of interest. Decreasing resolution of he visual information outside the region of interest, and displaying the transformed visual information on the display screen.

In accordance with yet a further aspect of the invention, there is provided a data carrier having stored thereon instructions for improving display of a transitional region while transitioning between a first region of interest and a second region of interest within visual information on a display screen of a computer. The instructions comprise the steps of: applying a transitional transformation to the visual information, the transitional transformation having a reduced a number of calculations required for rendering the transitional transformed visual information; and displaying the transitional transformed visual information on the display screen.

In accordance with yet a further aspect of the invention, there is provided a method for displaying visual information in portable document format (PDF) files on a display screen of a computer is provided. The method comprising the steps of: scaling the visual information to produce a scaled representation to fit on the display screen, the scaled representation generally containing the entire content of the visual information; selecting a region of interest within the scaled representation; applying a transformation to the scaled representation to improve the visual detail in the region of interest; and, displaying the transformed representation on the display screen. The step of applying a transformation further comprising the steps of: creating a lens surface of predetermined shape for the region of interest; and, creating a transformed representation by overlaying the scaled representation on the lens surface and projecting the lens surface with the overlaid scaled representation onto a plane.

In accordance with yet a further aspect of the invention, there is provided the use of a method for displaying visual information on a display screen of a computer for displaying visual information in portable document format (PDF) files is provided. The method comprising the steps of: scaling the visual information to produce a scaled representation to fit on the display screen, the scaled representation generally containing the entire content of the visual information; selecting a region of interest within the scaled representation; applying a transformation to the scaled representation to improve the visual detail in the region of interest; and, displaying the transformed representation on the display screen.

According to one aspect of the invention, there is provided a method for generating a presentation of a region of interest in an original image for display on a display screen, comprising: applying a lens to a border region of the region of interest in the original image by displacing the border region onto the lens and projecting the displacing onto a plane in a uniform direction aligned with a viewpoint, wherein at least one of the lens and the viewpoint remain constant while transitioning between first and second locations for the region of interest in the original image. The method may further include displaying the presentation on the display screen. The lens may have a magnified region for the border region. And, the magnified region may have a diminishing magnification.

According to another aspect of the invention, there is provided a system for generating a presentation of a region of interest in an original image for display on a display screen, comprising: a processor coupled to memory and the display screen; and, modules within the memory and executed by the processor, the modules including: a module for applying a lens to a border region of the region of interest in the original image by displacing the border region onto the lens and projecting the displacing onto a plane in a uniform direction aligned with a viewpoint, wherein at least one of the lens and the viewpoint remain constant while transitioning between first and second locations for the region of interest in the original image. The system may further include a module for displaying the presentation on the display screen. The lens may have a magnified region for the border region. And, the magnified region may have a diminishing magnification.

According to another aspect of the invention, there is provided a system for displaying a region of interest while transitioning between first and second locations for the region of interest within visual information on a display screen, comprising: a processor coupled to memory and the display screen; and, modules within the memory and executed by the processor, the modules including: a module for applying a transformation to a border region of the region of interest in the visual information to improve visual detail in the border region of the region of interest by: establishing a lens surface for the border region having a lens surface shape; and, generating a presentation by overlaying the visual information on the lens surface and projecting the lens surface with the visual information onto a plane in a uniform direction aligned with a viewpoint, wherein at least one of the lens surface shape and the viewpoint remain constant during the transitioning between the first and second locations; and, a module for displaying the presentation on the display screen. The transformation may transform only a portion of the visual information in the region of interest. The portion may be the border of the region of interest. The border region may be a periphery of the region of interest. The lens surface for the border region may be defined by a distortion function. The lens surface for the border region may be defined by a predetermined portion of a lens surface for rendering the region of interest. The predetermined portion may be a border region of the lens surface for rendering the region of interest. The predetermined portion may be a periphery of the lens surface for rendering the region of interest. The system may further include a module for establishing a path between the first and second locations for the region of interest. The path may be established automatically by a predetermined program. The path may be established by user selection. The system may further include a module for at least one of: increasing resolution of the visual information in the region of interest; and, decreasing resolution of the visual information outside the region of interest. The transformation may provide a smooth transition to the region of interest from an adjacent region by blending increased and decreased resolution visual information in predefined regions adjacent to the region of interest. The blending may be performed by averaging the increased and decreased resolution visual information. The blending may be performed by admixing the increased and decreased resolution visual information. The system may further include a module for transmitting the presentation over a network to a remote computer. The visual information may include a portable document format (PDF) document. The lens surface for rendering the region of interest may be defined by the distortion function. The region of interest, the lens surface, and the lens surface shape may include a plurality of regions of interest, a plurality of lens surfaces, and a plurality of lens surface shapes, respectively. The visual information may include one or more of newspapers, magazines, telephone directories, and maps. The visual information may include web page content. The display screen may be contained in a handheld device. The visual information may be a newspaper page. The newspaper page may include one or more of a plurality of headlines, columns, articles, graphics, and advertisements. The region of interest may include one or more of a headline, a column, an article, a graphic, and an advertisement. The lens surface shape may have a shape corresponding to that of the region of interest. The lens surface shape may have a shape corresponding to a column. The transformation may increase the font size within a portion of the column. The lens surface shape may be tapered to provide a continuous transition on at least one side of the portion of the column to undistorted text. And, the system may further include a module for scaling the visual information to fit on the display screen.

BRIEF DESCRIPTION OF THE DRAWINGS

The invention may best be understood by referring to the following description and accompanying drawings which illustrate the invention. In the drawings.

DETAILED DESCRIPTION OF THE PREFERRED EMBODIMENTS

Figure 1:
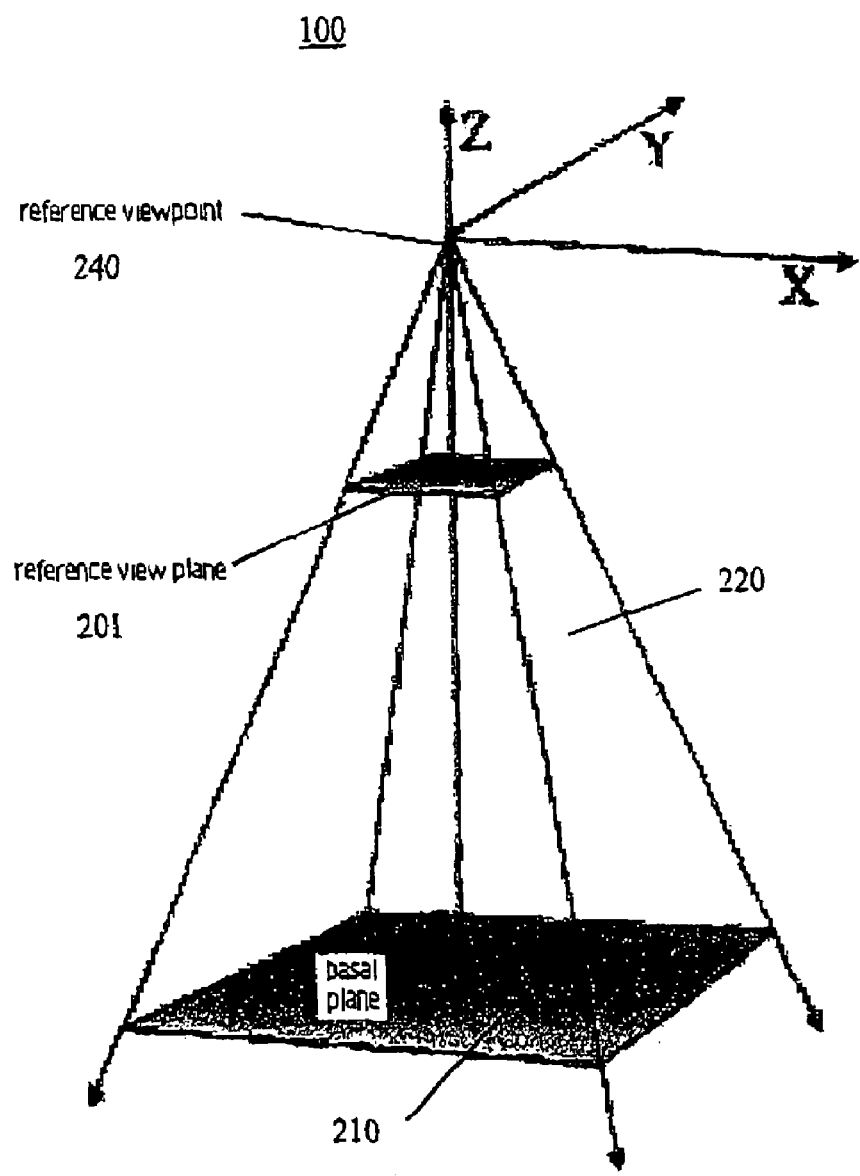
FIG. 1 is a perspective view of a 3D perspective viewing frustum in accordance with known elastic presentation space graphics technology.

In the following description, numerous specific details are set forth to provide a thorough understanding of the invention. However, it is understood that the invention may be practiced without these specific details. In other instances, well-known software, circuits, structures and techniques have not been described or shown in detail in order not to obscure the invention. The term "data processing system" is used herein to refer to any machine for processing data, including the computer systems and network arrangements described herein. The term "PDF" (Portable Document Format) is used herein to refer to a file format that captures all the elements of a printed document as an electronic image that a user can view, navigate, print, or forward to someone else. The term "Elastic Presentation Space" or "EPS" is used herein to refer to techniques that allow for the adjustment of a visual presentation without interfering with the information content of the representation. The adjective "elastic" is included in the term as it implies the capability of stretching and deformation and subsequent return to an original shape. EPS graphics technology is described by Carpendale in A Framework for Elastic Presentation Space (Carpendale, Marianne S. T., A Framework for Elastic Presentation Space (Burnaby, British Columbia: Simon Fraser University, 1999)) which is incorporated herein by reference. In EPS graphics technology, a two-dimensional visual representation is placed onto a surface; this surface is placed in three-dimensional space; the surface, containing the representation, is viewed through perspective projection; and the surface is manipulated to effect the reorganization of image details. The presentation transformation is separated into two steps: surface manipulation or distortion and perspective projection. In the drawings, like numerals refer to like structures or processes. Referring to FIG. 1, there is shown a perspective view 100 of a 3D perspective viewing frustum 220 in accordance with known elastic presentation space ("EPS") graphics technology. In EPS, detail-in-context views of 2D visual representations are created with sight-line aligned distortions of a 2D information presentation surface within a 3D perspective viewing frustum 220. In EPS, magnification of regions of interest and the accompanying compression of the context region to accommodate this change in scale are produced by the movement of regions of the surface towards the viewpoint 240 located at the apex of the pyramidal shape 220 containing the frustum. The process of projecting these transformed layouts via a perspective projection results in a new 2D layout which includes the zoomed and compressed regions. The use of the third dimension and perspective distortion to provide magnification in EPS provides a meaningful metaphor for the process of distorting the information presentation surface. The 3D manipulation of the information presentation surface in such a system is an intermediate step in the process of creating a new 2D layout of the information.

Figure 2:
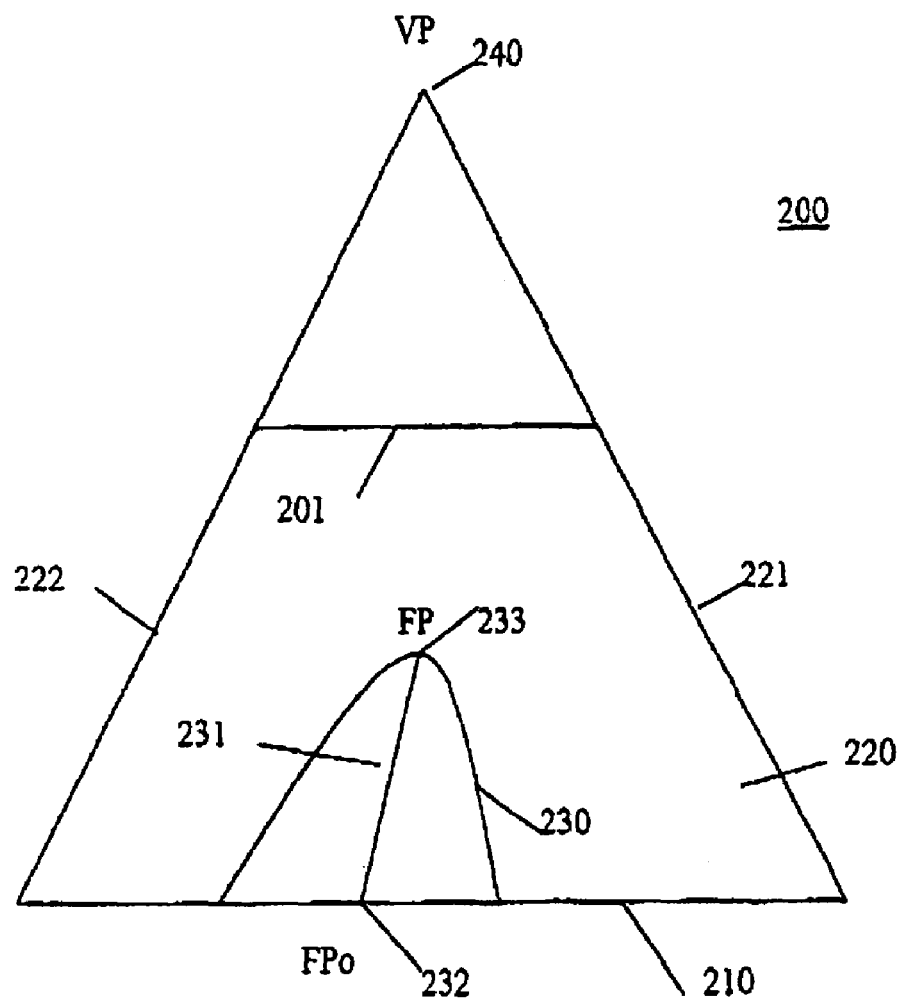
FIG. 2 is a cross-sectional view of a presentation in accordance with known elastic presentation space graphics technology.

Referring to FIG. 2, there is shown a cross-sectional view of a presentation 200 in accordance with known EPS graphics technology. EPS graphics technology employs viewer-aligned perspective projections to produce detail-in-context presentations in a reference view plane 201 which may be viewed on a display. Undistorted 2D data points are located in a basal plane 210 of a 3D perspective viewing volume or frustum 220 which is defined by extreme rays 221 and 222 and the basal plane 210. A viewpoint ("VP") 240 is located above the centre point of the basal plane 210 and reference view plane 201. Points in the basal plane 210 are displaced upward onto a distorted surface 230 which is defined by a general 3D distortion function (i.e. a detail-in-context distortion basis function). The direction of the viewer-aligned perspective projection corresponding to the distorted surface 230 is indicated by the line FPo-FP 231 drawn from a point FPo 232 in the basal plane 210 through the point FP 233 which corresponds to the focus or focal region or focal point of the distorted surface 230.

To reiterate, EPS refers to a collection of know-how and techniques for performing "detail-in-context viewing" (also known as "multi-scale viewing" and "distortion viewing") of information such as images, maps, and text, using a projection technique summarized below. EPS is applicable to multidimensional data and is well suited to implementation on a computer for dynamic detail-in-context display on an electronic display surface such as a monitor. In the case of two dimensional data, EPS is typically characterized by magnification of areas of an image where detail is desired, in combination with compression of a restricted range of areas of the remaining information (the "context"), the end result typically giving the appearance of a lens having been applied to the display surface. EPS has numerous advantages over conventional zoom, pan, and scroll technologies, including the capability of preserving the visibility of information outside the local region of interest.

In general, in EPS, the source image to be viewed is located in the basal plane. Magnification and compression are achieved through elevating elements of the source image relative to the basal plane, and then projecting the resultant distorted surface onto the reference view plane. EPS performs detail-in-context presentation of n-dimensional data through the use of a procedure wherein the data is mapped into a region in an (n+l) dimensional space, manipulated through perspective projections in the (n+l) dimensional space, and then finally transformed back into n-dimensional space for presentation.

For example, and referring to FIGS. 1 and 2, in two dimensions, EPS can be implemented through the projection of an image onto a reference plane 201 in the following manner. The source image is located on a basal plane 210, and those regions of interest 233 of the image for which magnification is desired are elevated so as to move them closer to a reference plane situated between the reference viewpoint 240 and the reference view plane (RVP) 201. Magnification of the "focal region" 233 closest to the RVP varies inversely with distance from the RVP 201. As shown in FIGS. 1 and 2, compression of regions outside the focal region 233 is a function of both distance from the RVP 201, and the gradient of the function describing the vertical distance from the RVP 201 with respect to horizontal distance from the focal region 233. The resultant combination of magnification and compression of the image as seen from the reference viewpoint 240 results in a lens-like effect similar to that of a magnifying glass applied to the image, and the resultant distorted image may be referred to as a "pliable display surface". Hence, the various functions used to vary the magnification and compression of the image via vertical displacement from the basal plane 210 are described as lenses, lens types, or lens functions. Lens functions that describe basic lens types with point and circular focal regions, as well as certain more complex lenses and advanced capabilities such as folding, have previously been described by Carpendale.

System.

Figure 3:
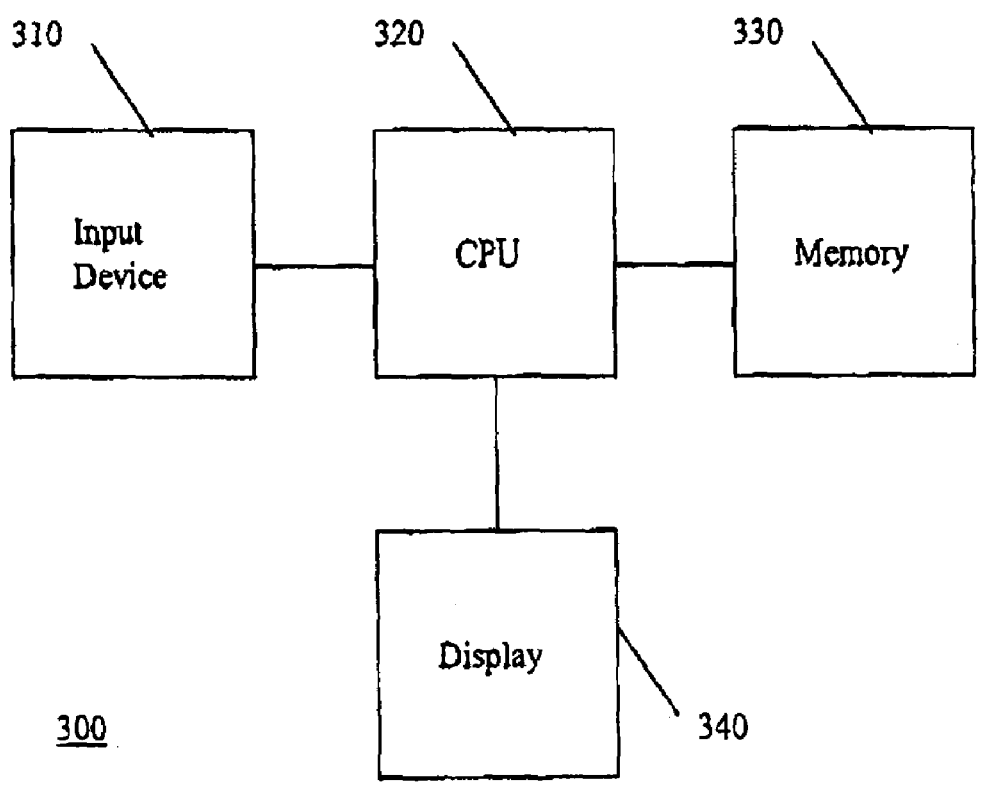
FIG. 3 is a block diagram of an exemplary data processing system for implementing an embodiment of the invention.

Referring to FIG. 3, there is shown a block diagram of an exemplary data processing system 300 for implementing an embodiment of the invention. The data processing system is suitable for implementing EPS technology and for viewing PDF files. The data processing system 300 includes an input device 310, a central processing unit or CPU 320, memory 330, and a display 340. The input device 310 may be a keyboard, mouse, trackball, or similar device. The CPU 320 may include dedicated coprocessors and memory devices. The memory 330 may include RAM, ROM, databases, or disk devices. And, the display 340 may include a computer screen or terminal device. The data processing system 300 has stored therein data representing sequences of instructions which when executed cause the method described herein to be performed. Of course, the data processing system 300 may contain additional software and hardware a description of which is not necessary for understanding the invention.

Presentation of PDF Files Using EPS.

According to one aspect of the invention, EPS is applied to the electronic and online (i.e. Internet) presentation of Portable Document Format ("PDF") files. PDF is a file format that captures the elements of a printed document as an electronic image that a user can view, navigate, print, or forward to someone else. PDF files are created using software products such as Adobe Acrobat®. To view and use a PDF file, a product such as Adobe Acrobat Reader® is typically used. PDF files are especially useful for documents such as newspaper and magazine articles, product brochures, or flyers where it is desired to preserve the original graphic appearance online. For example, a PDF file may be used for the online distribution of a printed document where it is desirable to preserve its printed appearance.

EPS and detail-in-context viewing can be used to enhance the viewing of PDF files, This is affected by the electronic scaling of the document content to a size that allows presentation of the full content on the display surface, with the use of specialized EPS lenses to enlarge regions of interest 233 To make them readable to the user. This method can be used to achieve the more effective presentation of PDF file content on small display surfaces including handheld computers. This aspect of the invention can be implemented with pre-placed EPS lenses on important content components including headlines, feature articles, tables of contents, and advertisements. Interaction with the reader is such that articles in the reader's region of interest 233 are enlarged automatically via EPS lenses of complex shape to suit the shape of the article or other area of interest.

Figure 4:
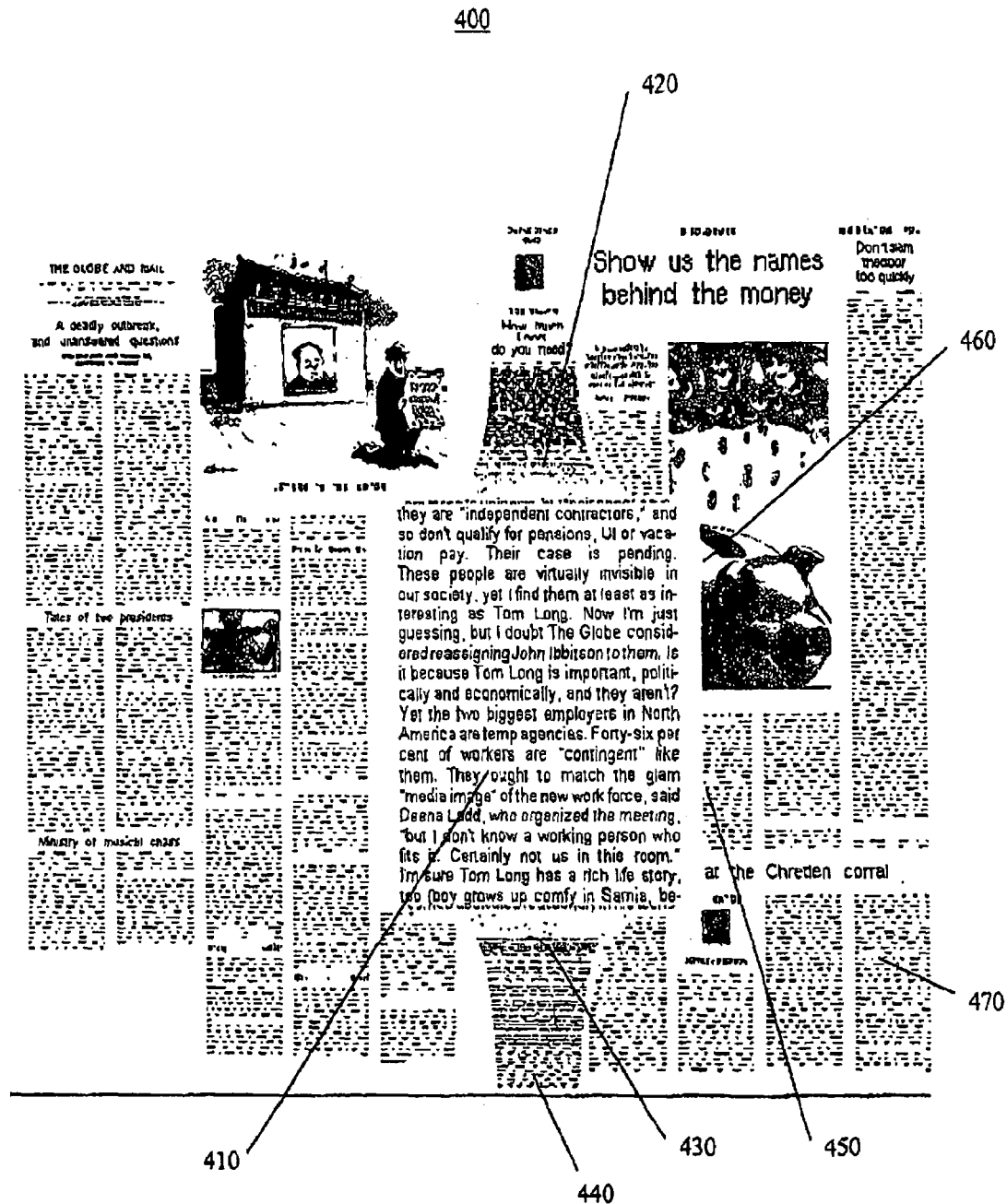
FIG. 4 is a screen capture of a PDF file for a newspaper page that has been shrunk to fit a display surface in accordance with one embodiment of the invention; and, FIG. 5 is a flow chart illustrating a general method for displaying visual information in portable document format (PDF) files on a display screen of a computer in accordance with one embodiment of the invention.

Referring to FIG. 4, there is shown a screen capture 400 of a PDF file for a newspaper page that has been effectively shrunk to fit a display surface 340 according to one embodiment of the invention. A lens 410 has been used in the fifth column to increase the font size in the reader's region of interest 233. The top 420 and bottom 430 of the lens 410 are tapered to provide a continuous transition to the unmagnified text 440. Partial overwriting of neighboring columns 450 and images 460 by the lens 410, rather than a lateral distortion, is performed to blend the lens 410 into the undistorted regions 470, and provide enough space for the lens 410 while preserving the spatial orientation of the neighboring columns.

The implementation of pre-placed lenses can be achieved as follows. In order to provide the user with an immediate view of certain regions of a file, items of interest such as article headlines, whole articles, or advertisements can have lenses 410 in place when the document is first viewed. This can be implemented, for example, through the use of special lens locating information (i.e. locating tags) embedded within The source file or in a separate data layer, indicating the characteristics, location and/or bounds of the lens.

Method and Use.

Figure 5:
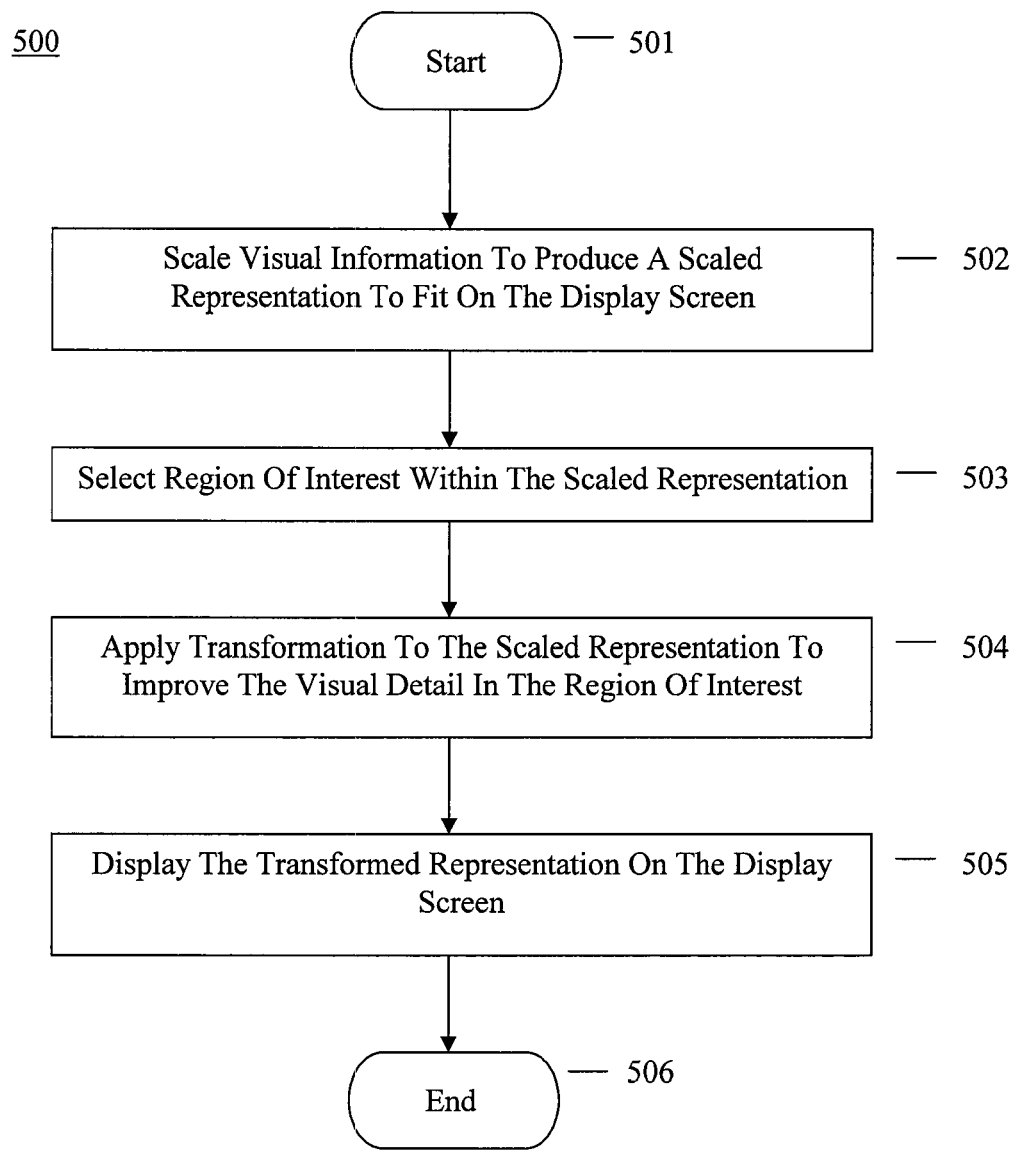

Referring to FIG. 5, there is shown a flow chart 500 illustrating a general method for displaying visual information in portable document format (PDF) files on a display screen of a computer according to one embodiment of the invention. At step 501, the method starts. At step 502, the visual information is scaled to produce a scaled representation to fit on the display screen. The scaled representation generally contains the entire content of the visual information. At step 503, a region of interest is selected within the scaled representation. At step 504, a transformation is applied to the scaled representation to improve the visual detail in the region of interest. At step 505, the transformed representation is displayed on the display screen. At step 506, the method ends. Thus, elastic presentation space methodology can be used for displaying visual information in portable document format (PDF) files on a display screen of a computer.

Restricted Rendering of Lens During Lens Motion.

According to another aspect of the invention, a restricted portion of the region of interest (i.e. the "lens") 233, for example the border or periphery 420, 430 of a lens 410, is rendered to a display 340 during the movement of the lens about the data space. The movement of the lens 410 may be user initiated or automated. By rendering only a portion of the lens 410, the computations required for lens movement and rendering are minimized while a presentation of the changing location of the lens is maintained. When movement of the lens ceases, by user or automated means, a full rendering of the lens in its new location can be displayed. In this way, the number of computations required during the movement of the lens 410 is reduced and hence performance is improved which is especially important for systems 300 with limited computational speed.

Blending and Selective Use of Data at Multiple Resolutions.

To improve detail-in-context presentation quality, an increase in the spatial resolution or level of detail within the region of interest 233, 410 can be provided as can a smooth visual transition from the region of interest to surrounding regions 440, 470.

According to another aspect of the invention, an increase in resolution within the region of interest 233, 410 of a detail-in-context presentation is provided by the selective high resolution rendering to a display 340 of data within the region of interest 233, 410 and neighbouring regions 420, 430 of a detail-in-context lens while the remaining data 440, 470 in the presentation is rendered at low resolution. In this way, resolution within and about the region of interest 233, 410 can be increased with a minimum of computing resources (i.e. processing time and processor memory).

According to another aspect of the invention, a smooth visual transition from the region of interest 233, 410 to surrounding regions 440, 470 is provided by the blending of low and high resolution regions 410, 420, 430, 440, 470. This blending can be accomplished by averaging or admixing of the high and low resolution regions described above. In this way, a smooth visual transition can be provided from the region of interest to surrounding regions with a minimum of computing resources (i.e. processing time and processor memory).

In the case where the client device on which the data is viewed is located apart from the data source (e.g. connected via the Internet), it is an advantage of the present invention that by increasing the resolution within the region of interest and smoothing the visual transition from the region of interest to surrounding regions as described, the amount of data that has to be transferred from the data source (e.g. server) to the viewer (e.g. client) is minimized.

Computer Software Product.

The sequences of instructions which when executed cause the method described herein to be performed by the exemplary data processing system of FIG. 3 can be contained in a computer software product according to one embodiment of the invention. This computer software product can be loaded into and run by the exemplary data processing system of FIG. 3.

Integrated Circuit Product.

The sequences of instructions which when executed cause the method described herein to be performed by the exemplary data processing system of FIG. 3 can be contained in an integrated circuit product including a coprocessor or memory according to one embodiment of the invention. This integrated circuit product can be installed in the exemplary data processing system of FIG. 3.

Although the invention has been described with reference to certain specific embodiments, various modifications thereof will be apparent to those skilled in the art without departing from the spirit and scope of the invention as outlined in the claims appended hereto.

What is claimed is:

1. A method for generating a presentation of a region of interest in an original image for display on a display screen, comprising:

applying a lens to a border region of the region of interest in the original image by displacing the border region onto the lens and projecting the displacing onto a plane in a uniform direction aligned with a viewpoint, wherein the lens remains constant while transitioning between first and second locations for the region of interest in the original image; and, displaying the presentation on the display screen.

2. The method of claim 1 wherein the viewpoint remains constant while transitioning between the first and second locations.

3. The method of claim 2 wherein the lens has a magnified region for the border region.

4. The method of claim 3 wherein the magnified region has a diminishing magnification.

5. A system for generating a presentation of a region of interest in an original image for display on a display screen, comprising:

a processor coupled to memory and the display screen; and, modules within the memory and executed by the processor, the modules including:

a module for applying a lens to a border region of the region of interest in the original image by displacing the border region onto the lens and projecting the displacing onto a plane in a uniform direction aligned with a viewpoint, wherein the viewpoint remains constant while transitioning between first and second locations for the region of interest in the original image; and, a module for displaying the presentation on the display screen.

6. The system of claim 5 wherein the lens remains constant while transitioning between the first and second locations.

7. The system of claim 6 wherein the lens has a magnified region for the border region.

8. The system of claim 7 wherein the magnified region has a diminishing magnification.

9. A system for displaying a region of interest while transitioning between first and second locations for the region of interest within visual information on a display screen, comprising:

a processor coupled to memory and the display screen; and, modules within the memory and executed by the processor, the modules including:

a module for applying a transformation to a border region of the region of interest in the visual information to improve visual detail in the border region of the region of interest by:

establishing a lens surface for the border region having a lens surface shape; and, generating a presentation by overlaying the visual information on the lens surface and projecting the lens surface with the visual information onto a plane in a uniform direction aligned with a viewpoint, wherein at least one of the lens surface shape and the viewpoint remain constant during the transitioning between the first and second locations; and, a module for displaying the presentation on the display screen.

10. The system of claim 9 wherein the transformation transforms only a portion of the visual information in the region of interest.

11. The system of claim 10 wherein the portion is the border of the region of interest.

12. The system of claim 9 wherein the border region is a periphery of the region of interest.

13. The system of claim 9 wherein the lens surface for the border region is defined by a distortion function.

14. The system of claim 9 wherein the lens surface for the border region is defined by a predetermined portion of a lens surface for rendering the region of interest.

15. The system of claim 14 wherein the predetermined portion is a border region of the lens surface for rendering the region of interest.

16. The system of claim 15 wherein the predetermined portion is a periphery of the lens surface for rendering the region of interest.

17. The system of claim 14 wherein the lens surface for rendering the region of interest is defined by the distortion function.

18. The system of claim 9 and further comprising a module for establishing a path between the first and second locations for the region of interest.

19. The system of claim 18 wherein the path is established automatically by a predetermined program.

20. The system of claim 18 wherein the path is established by user selection.

21. The system of claim 9 and further comprising a module for at least one of: increasing resolution of the visual information in the region of interest; and, decreasing resolution of the visual information outside the region of interest.

22. The system of claim 21 wherein the transformation provides a smooth transition to the region of interest from an adjacent region by blending increased and decreased resolution visual information in predefined regions adjacent to the region of interest.

23. The system of claim 22 wherein the blending is performed by averaging the increased and decreased resolution visual information.

24. The system of claim 22 wherein the blending is performed by admixing the increased and decreased resolution visual information.

25. The system of claim 9 and further comprising a module for transmitting the presentation over a network to a remote computer.

26. The system of claim 9 wherein the visual information includes a portable document format (PDF) document.

27. The system of claim 26 and further comprising a module for scaling the visual information to fit on the display screen.

28. The system of claim 9 wherein the region of interest, the lens surface, and the lens surface shape include a plurality of regions of interest, a plurality of lens surfaces, and a plurality of lens surface shapes, respectively.

29. The system of claim 9 wherein the visual information includes one or more of newspapers, magazines, telephone directories, and maps.

30. The system of claim 9 wherein the visual information includes web page content.

31. The system of claim 9 wherein the display screen is contained in a handheld device.

32. The system of claim 9 wherein the visual information is a newspaper page.

33. The system of claim 32 wherein the newspaper page includes one or more of a plurality of headlines, columns, articles, graphics, and advertisements.

34. The system of claim 33 wherein the region of interest includes one or more of a headline, a column, an article, a graphic, and an advertisement.

35. The system of claim 34 wherein the lens surface shape has a shape corresponding to that of the region of interest.

36. The system of claim 35 wherein the lens surface shape has a shape corresponding to a column.

37. The system of claim 36 wherein the transformation increases the font size within a portion of the column.

38. The system of claim 37 wherein the lens surface shape is tapered to provide a continuous transition on at least one side of the portion of the column to undistorted text.

* * * * *

UNITED STATES PATENT AND TRADEMARK OFFICE
CERTIFICATE OF CORRECTION

PATENT NO. : 7,283,141 B2  Page 1 of 1
APPLICATION NO. : 11/444478
DATED : October 16, 2007
INVENTOR(S) : David J. P. Baar et al.

It is certified that error appears in the above-identified patent and that said Letters Patent is hereby corrected as shown below:

Column 2, line 3: Replace the word "Bumaby" with the word --Burnaby--.

Column 3, line 15: Replace the word "he" with the word --the--.

Column 6, line 9: Replace the word "Bumaby" with the word --Burnaby--.

Column 8, line 17: Replace the comma after the word "files" with a period.

Column 8, line 21: Replace the word "To" with the word --to--.

Column 8, line 51: Replace the word "The" with the word --the--.

Signed and Sealed this

Twenty-fifth Day of December, 2007

JON W. DUDAS
*Director of the United States Patent and Trademark Office*